(12) United States Patent
Choi et al.

(10) Patent No.: US 10,132,713 B2
(45) Date of Patent: Nov. 20, 2018

(54) ACTIVE JOINT MODULE AND ROBOT FOR INSPECTION OF PIPELINE WITH THIS MODULE

(71) Applicant: Research & Business Foundation SUNGKYUNKWAN UNIVERSITY, Suwon-si (KR)

(72) Inventors: Hyouk Ryeol Choi, Gunpo-si (KR); Homoon Kim, Bucheon-si (KR); Hyeong Min Moon, Suwon-si (KR); Chanmin Park, Busan (KR); Seung Ung Yang, Cheongju-si (KR); Yun Seok Choi, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 407 days.

(21) Appl. No.: 14/931,098

(22) Filed: Nov. 3, 2015

(65) Prior Publication Data

US 2016/0136823 A1    May 19, 2016

(30) Foreign Application Priority Data

Nov. 13, 2014    (KR) ........................ 10-2014-0158262

(51) Int. Cl.
| | |
|---|---|
| *G01M 3/00* | (2006.01) |
| *F17D 5/02* | (2006.01) |
| *F16L 55/40* | (2006.01) |
| *F16L 101/30* | (2006.01) |

(52) U.S. Cl.
CPC ............ *G01M 3/005* (2013.01); *F16L 55/40* (2013.01); *F17D 5/02* (2013.01); *F16L 2101/30* (2013.01); *Y10S 901/28* (2013.01)

(58) Field of Classification Search
CPC ............ F16L 55/40; G01M 3/005; F17D 5/02
See application file for complete search history.

(56) References Cited

U.S. PATENT DOCUMENTS

| | | | | |
|---|---|---|---|---|
| 4,862,808 A | * | 9/1989 | Hedgcoxe | ................ B25J 5/007 104/138.2 |
| 6,162,171 A | * | 12/2000 | Ng | ..................... A61B 1/00156 600/101 |
| 6,917,176 B2 | * | 7/2005 | Schempf | ............... G01M 3/005 318/568.11 |
| 7,736,300 B2 | * | 6/2010 | Ziegler | .............. A61B 1/00156 348/82 |

(Continued)

FOREIGN PATENT DOCUMENTS

KR    10-2009-0010697    1/2009

*Primary Examiner* — David M Fenstermacher
(74) *Attorney, Agent, or Firm* — NSIP Law

(57) ABSTRACT

Provided herein is an active joint module, and a robot for inspecting pipelines having the active joint module, the active joint module including a frame unit; a first bracket connected to one side of the frame unit in a rotatable manner, and to which a first module is coupled; a second bracket connected to another side of the frame unit in a rotatable manner, and to which a second module is coupled; and a bracket rotating unit supported to the frame unit, and is configured to rotate the first bracket and second bracket independently from each other in response to receiving an operating signal, and to unconstrain rotation of the first bracket and second bracket in response to there being no operating signal received.

20 Claims, 6 Drawing Sheets

(56) References Cited

U.S. PATENT DOCUMENTS

| | | | | |
|---|---|---|---|---|
| 8,170,715 B1* | 5/2012 | Vallapuzha | ............ | F16L 55/265 |
| | | | | 138/97 |
| 8,805,579 B2* | 8/2014 | Skrinde | ................... | B08B 9/049 |
| | | | | 134/18 |
| 8,950,338 B2* | 2/2015 | Early | ...................... | F16L 55/32 |
| | | | | 104/138.1 |
| 9,353,902 B2* | 5/2016 | Early | .................... | F16L 55/265 |
| 9,383,055 B2* | 7/2016 | Hirose | .................... | B61B 13/10 |
| 9,528,651 B2* | 12/2016 | Hsu | ........................ | F16L 55/40 |
| 9,719,315 B2* | 8/2017 | Hughes | .................. | E21B 19/22 |
| 9,791,090 B2* | 10/2017 | Hirose | .................... | F16L 55/40 |
| 9,804,132 B2* | 10/2017 | Hoyt | ..................... | G01N 29/225 |
| 2003/0089267 A1* | 5/2003 | Ghorbel | ................. | F16L 55/26 |
| | | | | 104/138.1 |
| 2004/0173116 A1* | 9/2004 | Ghorbel | ................. | F16L 55/26 |
| | | | | 104/138.2 |

* cited by examiner

Prior Art

ACTIVE JOINT MODULE AND ROBOT FOR INSPECTION OF PIPELINE WITH THIS MODULE

CROSS-REFERENCE TO RELATED APPLICATION

This application claims the benefit of priority under 35 U.S.C. § 119(a) of Korean Patent Application No. 10-2014-0158262, filed on Nov. 13, 2014, in the Korean Intellectual Property Office, the entire disclosure of which is incorporated herein by reference for all purposes.

BACKGROUND

1. Field

The following description relates to an active joint module and a robot for inspecting pipelines having the active joint module, and more particularly, to an active joint module and a robot for inspecting pipelines that is capable of easily changing the driving direction of a robot for inspecting pipelines in a direction-variable area in a pipeline, 2. Description of Related Art A pipeline is generally one of the structures of industrial infrastructure, which transfers various energy sources such as gas/petroleum, and distributes them to the right places on a timely basis.

Such pipelines are distributed here and there nationwide like blood vessels in a human body, and are being established as core infrastructure that continuously provide energy sources such as petroleum/gas to various city infrastructure and factory facilities. Furthermore, pipelines in large scale plants such as petrochemical plants are being used as major facilities to transfer various chemical materials that need to be refined and processed.

However, as a certain period of time passes after the pipelines are constructed, damages may occur in the pipelines due to corrosion caused by moisture and various chemical materials and effect by external environments, which may lead to leakage of the materials from inside the pipelines.

Leaking of petroleum and chemical materials may cause serious environmental pollution, and leaking of gas may cause big gas explosion accidents. Therefore, after a certain period of time has passed since the pipelines were installed, they need to be inspected and replaced on a regular basis.

Pipelines may be classified into extensive type pipelines and compact type pipelines depending on the type of installation. The extensive type pipelines are used for water and sewage lines, gas feeding lines, and petroleum feeding lines mainly in urban and national facilities. These types of pipelines are usually buried underground in order to prevent them from being damaged by external environment, to maintain the aesthetic urban landscape and to prevent them from being corroded, but since they are buried underground, they must be dug up every time they need to be repaired, or inspected, which is a disadvantage. The compact type pipelines are mainly used in plants such as petrochemical plants, and are entangled due to their complex transfer systems, and in many cases, they include route divergent areas (for example, divergent pipelines). The compact type pipelines have disadvantages that in order to inspect the pipelines in the inside, one has to take the trouble of removing the pipelines at the outside. Furthermore, pipelines installed in high places are not easily approachable.

Therefore, there has been a need for an inspection equipment that could approach the pipelines in a more convenient and less expensive way, and that could inspect the pipelines as it moves round inside the pipelines by driving methods suitable to the three-dimensional shape of the pipeline.

Consequently, mobile robots have been developed that could thoroughly examine the inside of pipelines while driving inside the peculiar and limited three-dimensional space of the pipelines. A lot of research is underway regarding these types of robots.

FIG. 1 is a diagram illustrating a conventional robot for inspecting pipelines, and FIG. 2 is a diagram illustrating a link module of FIG. 1.

As illustrated in FIG. 1 and FIG. 2, a conventional robot for inspecting pipelines is that driving modules 10 installed in front and rear parts of the robot, control modules 20 and battery modules 30 is connected by means of link modules 40. Such a link module 40 is provided with a universal joint such that the robot for inspecting pipelines could be flexibly transformed according to the shape of a pipeline.

However, such a conventional link module 40 only changes the shape of the robot for inspecting pipelines passively according to the shape of a pipeline, and thus is incapable of improving the steering performance of the robot, which is a problem.

Therefore, in order to improve the steering performance of the robot for inspecting pipelines, the link module 40 that connects the modules 10, 20, 30 of the robot for inspecting pipelines must be configured as an active type link module. Furthermore, in order to minimize power consumption, the link module 40 must be configured to maintain its active state only in certain areas.

That is, there is a need to develop an active joint module configured to be at an active state and thus consumes power when driving through a route divergent area (for example, divergent pipeline) but configured to be at a passive state and thus does not consume power when driving through a general area (for example, driving through a straight pipeline), and a robot for inspecting pipelines provided with such an active joint module.

PRIOR ART DOCUMENTS

Patents

Korean Patent Publication no. 10-2009-0010697 (the Academic-Industrial Cooperation Group of Sung Kyun Kwan University), Jan. 30, 2009

All documents cited in the present disclosure, including published documents, patent applications, and patents, may be incorporated herein in their entirety by reference in the same manner as when each cited document is separately and specifically incorporated or incorporated in its entirety.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A purpose of the present disclosure is to resolve the aforementioned problems of the conventional technique, that is, to provide an active joint module configured to be at an active state and thus consumes power when driving through a route divergent area, but configured to be at a passive state and thus does not consume power when driving through a general area, and a robot for inspecting pipelines provided with such an active joint module.

According to an aspect, there is provided an active joint module including: a frame unit; a first bracket connected to one side of the frame unit in a rotatable manner, and to which a first module is coupled; a second bracket connected to another side of the frame unit in a rotatable manner, and to which a second module is coupled; and a bracket rotating unit supported to the frame unit, and is configured to rotate the first bracket and second bracket independently from each other, and to unconstrain rotation of the first bracket and second bracket.

The bracket rotating unit may rotate the first bracket and second bracket independently from each other in response to an operating signal received from a controller, and unconstrain rotation of the first bracket and second bracket in response to there being no operating signal received.

Herein, the bracket rotating unit may include a first bracket rotating unit connected to the first bracket, and rotates the first bracket; and a second bracket rotating unit arranged near the first bracket rotating unit, and connected to the second bracket and rotates the second bracket.

The first bracket rotating unit and second bracket rotating unit may include a main pulley connected to the frame unit in a rotatable manner, and to which the first bracket and second bracket are coupled, respectively; and a pulley rotating unit connected to the main pulley, and rotates the main pulley.

The pulley rotating unit may include a sub pulley connected to the frame unit in a rotatable manner, and arranged in a distanced position from the main pulley; a wire connected to the main pulley and sub pulley, and rotates the main pulley and sub pulley; and a wire motion unit connected to the wire, and moves the wire.

The wire motion unit may include an LM block to which the wire is coupled; an LM guide that guides motion of the LM block; and an LM block driving unit that moves the LM block.

The LM block driving unit may include a driving motor; a ball screw connected to the driving motor, and configured to be rotated by the driving motor; and a moving nut coupled to the LM block, and configured to be geared to the ball screw.

The LM block driving unit may include a plurality of power transmission gears configured to connect the driving motor and ball screw, and to transmit driving force of the driving motor to the ball screw.

The frame unit may include a main frame; and a tension adjusting unit supported to the main frame, and configured to move the sub pulley in a direction approaching or distancing from the main pulley so as to adjust tension of the wire.

The tension adjusting unit may include a motion block to which the sub pulley is coupled in a rotatable manner, and that is connected to the main frame in a movable manner; a motion block guide unit configured to guide motion of the motion block; and a motion block driving unit configured to move the motion block.

In the motion block guide unit, a guide hole may be formed through which a guide arm protruding from the motion block passes.

The motion block driving unit may include an adjusting screw geared to the motion block guide unit and configured to press the motion block.

The aforementioned purposes are achieved by a robot for inspecting pipelines provided with an active joint module according to the present disclosure.

Various aforementioned aspects of the present disclosure have an effect of providing an active joint module and a robot for inspecting pipelines having the active joint module, wherein a bracket rotating unit actively rotates a first bracket to which a first module is coupled and a second bracket to which a second module is coupled according to an operating signal, so that a rotating angle of the first bracket and second bracket may be adjusted, thereby improving the driving performance of the robot for inspecting pipelines, and wherein the bracket rotating unit may unconstrain rotation of the first bracket and second bracket when driving along a general area so as not to waste unnecessary energy.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, an active joint module and a robot for inspecting pipelines provided with the active joint module according to an embodiment of the present disclosure will be explained in more detail with reference to the drawings attached.

Figure 1:
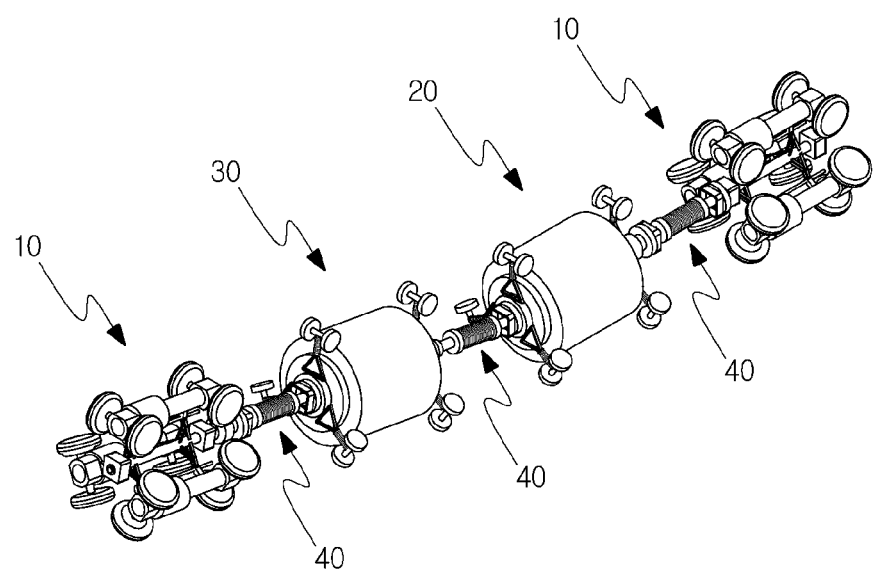
FIG. 1 is a view illustrating a conventional robot for inspecting pipelines.
Figure 2:
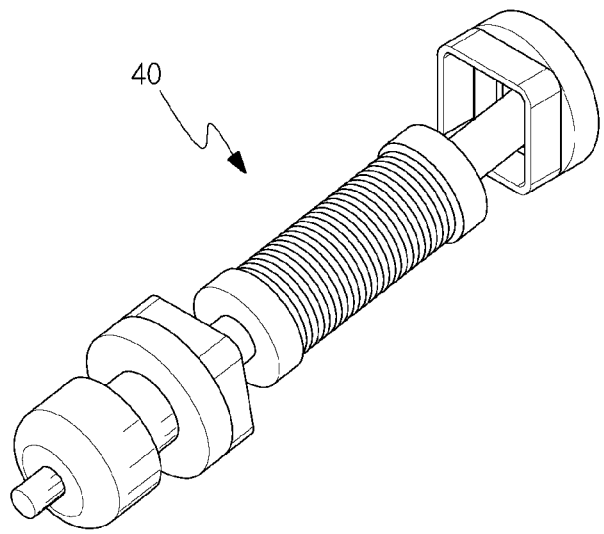
FIG. 2 is a view illustrating a link module of FIG. 1.
Figure 3:
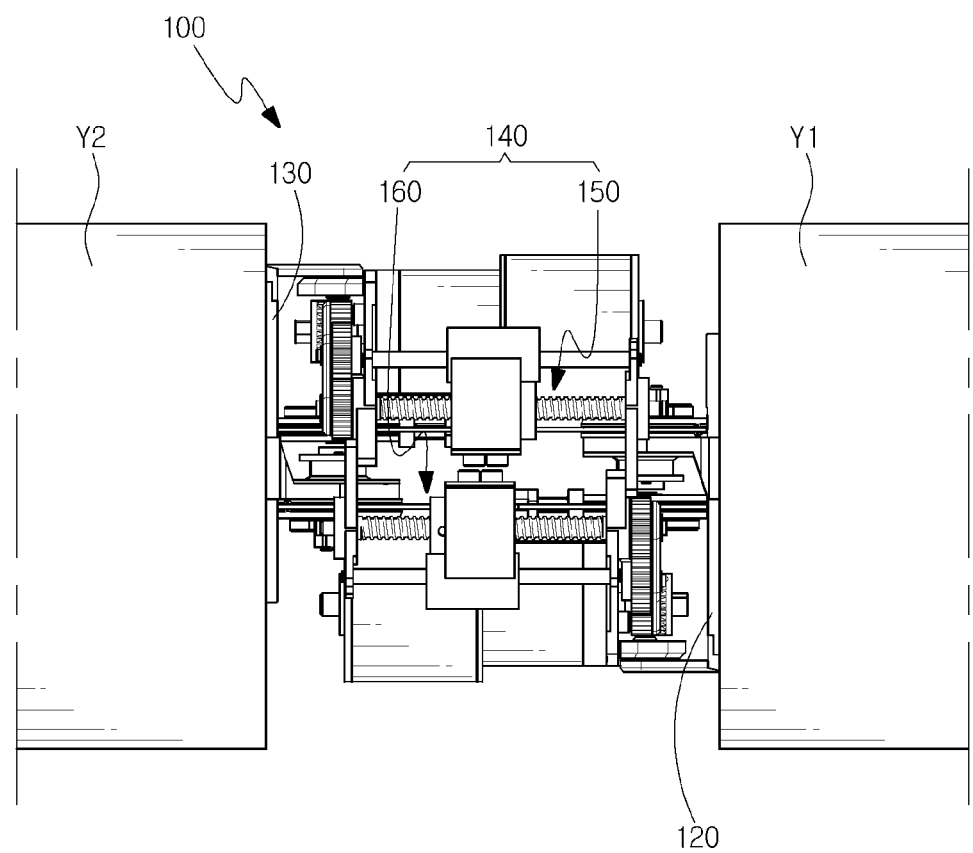
FIG. 3 is a view illustrating an active joint module and a robot for inspecting pipelines having the active joint module according to an embodiment of the present disclosure.
Figure 4:
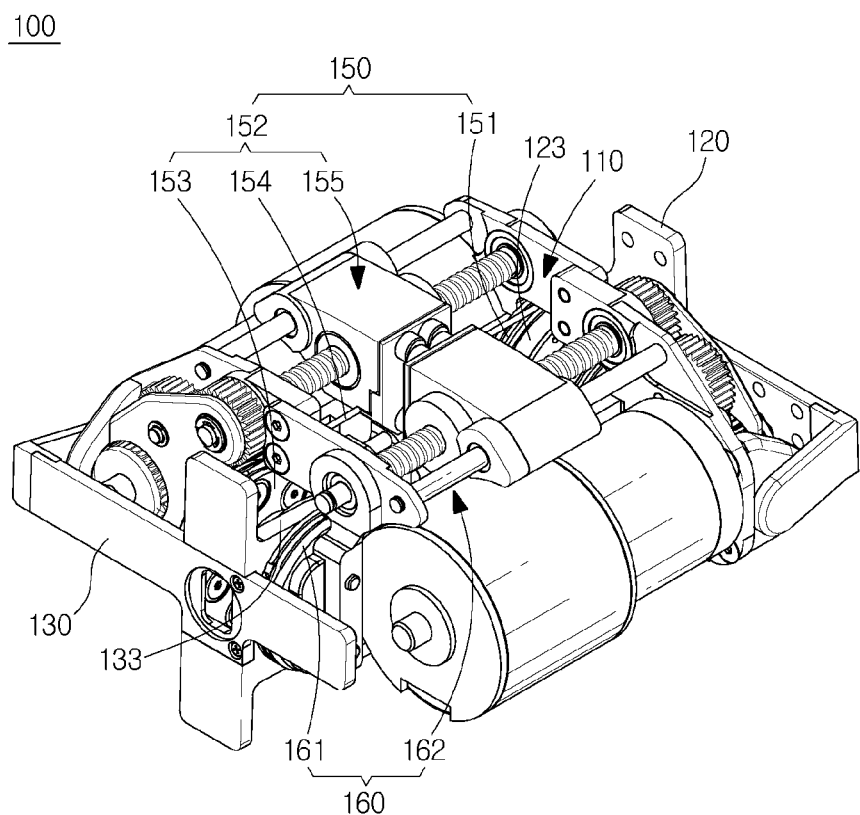
FIG. 4 is a perspective view illustrating the active joint module of FIG. 3.
Figure 5:
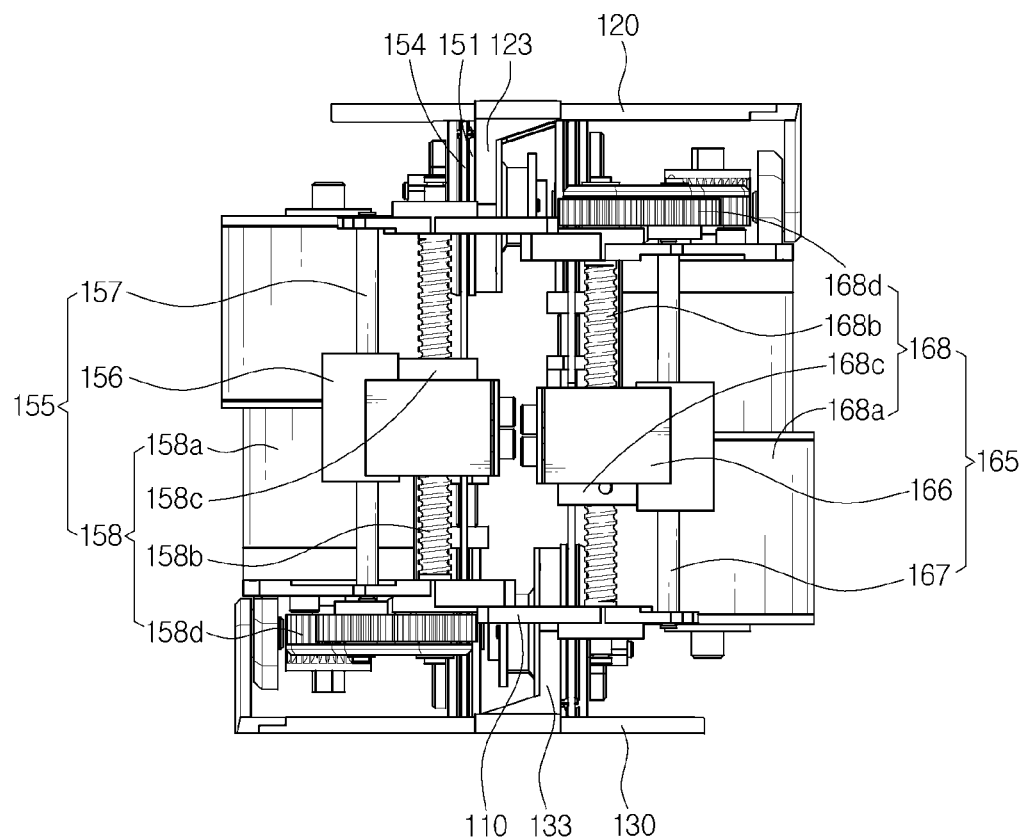
FIG. 5 is a plane view of FIG. 4.
Figure 6:
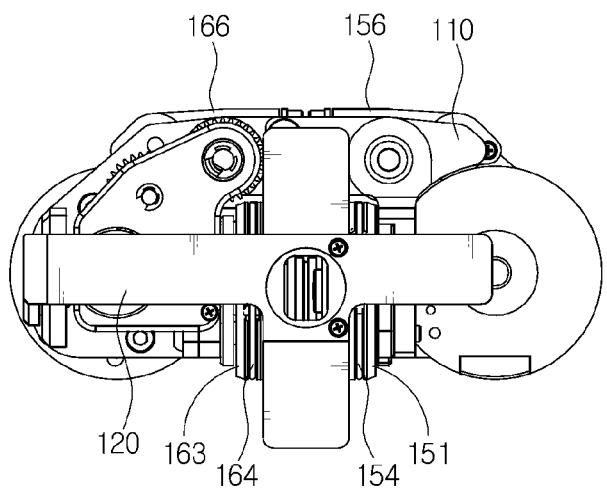
FIG. 6 a front view of FIG. 4.
Figure 7:
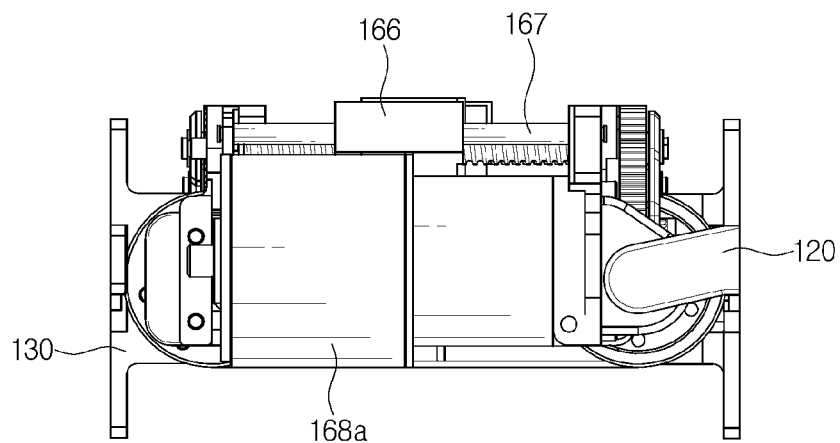
FIG. 7 is a side view of FIG. 4.
Figure 8:
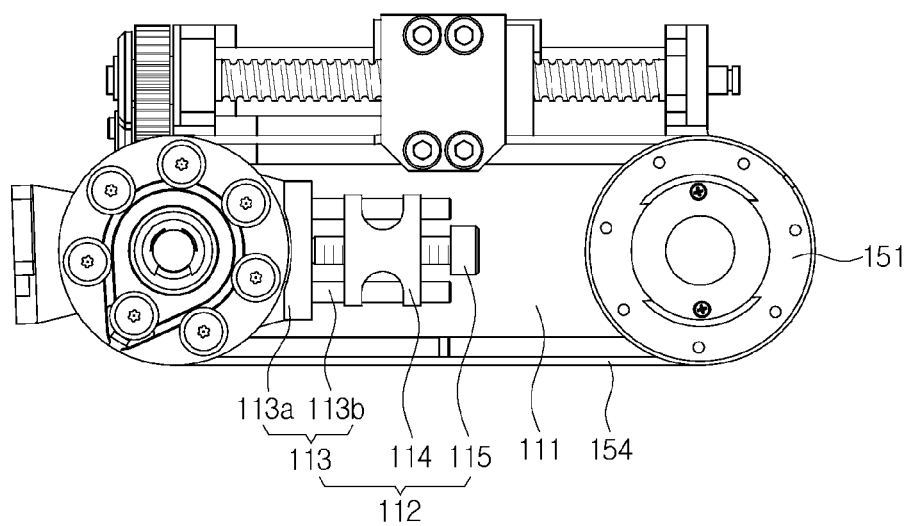
FIG. 8 and FIG. 9 are views illustrating a tension adjusting unit of the active joint module of FIG. 4.
Figure 9:
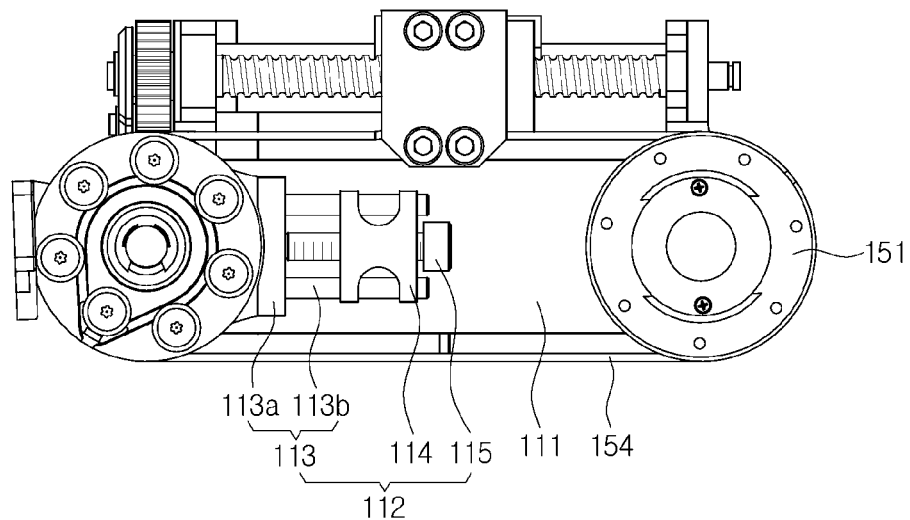
Figure 10:
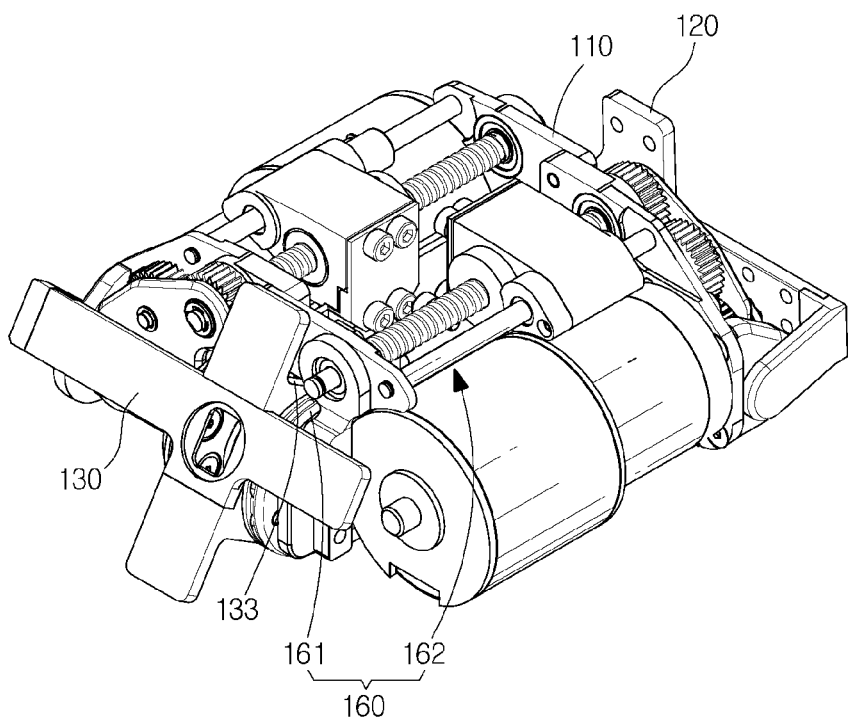
FIG. 10 is a view illustrating a second bracket of FIG. 4 at a rotated state.

FIG. 3 is a view illustrating an active joint module and a robot for inspecting pipelines provided with the active joint module according to an embodiment of the present disclosure; FIG. 4 is a perspective view illustrating the active joint module of FIG. 3; FIG. 5 is a plane view of FIG. 4; FIG. 6 a front view of FIG. 4; FIG. 7 is a side view of FIG. 4; FIG. 8 and FIG. 9 are views illustrating a tension adjusting unit of the active joint module of FIG. 4; and FIG. 10 illustrates a second bracket of FIG. 4 at a rotated state.

As illustrated in FIGS. 3 to 10, a robot for inspecting pipelines according to an embodiment of the present disclosure includes the active joint module 100.

The active joint module 100 according to this embodiment includes a frame unit 110; a first bracket 120 connected to one side of the frame unit 110 in a rotatable manner and to which a first module (Y1) is coupled; a second bracket 130 connected to another side of the frame unit 110 in a rotatable manner and to which a second module (Y2) is coupled; and a bracket rotating unit 140 supported to the frame unit 110 and that rotates the first bracket 120 and second bracket 130 independently from each other in response to an operating signal received from a controller (not illustrated), but unconstrains rotation of the first bracket 120 and second bracket 130 when there is no operating signal received.

In this embodiment, each of the first module (Y1) and second module (Y2) may be one of a driving module, control module, and battery module. The driving module generates a driving force and momentum. A power supply device is mounted on the battery module, and the battery module supplies power to the driving module, control module, and active joint module 100. A controller (not illustrated) is mounted on the control module, and the control module sends a driving signal to the driving module and an operating signal to the active joint module 100.

The first bracket 120 is connected to one side of the frame unit 110 in a rotatable manner, and the first module (Y1) is coupled to the first bracket 120. The second bracket 130 is connected to another side of the frame unit 110 in a rotatable manner, and the second module (Y2) is coupled to the second bracket 130. In this embodiment, the first bracket 120 and second bracket 130 are arranged such that they are spaced by a certain distance from each other.

The robot for inspecting pipelines according to this embodiment is provided with the active joint module 100 wherein the first bracket 120 and the second bracket 130 are configured to rotate around a hypothetical central axis, respectively, thereby providing an effect that other modules (Y1, Y2) besides the active joint module 100 move along a central line of the pipeline.

The bracket rotating unit 140 is supported to the frame unit 110, and rotates the first bracket 120 and second bracket 130 independently from each other in response to an operating signal received from the controller (not illustrated). Furthermore, the bracket rotating unit 140 unconstrains rotation of the first bracket 120 and second bracket 130 when there is no operational signal received.

When there is no input of such an operating signal, the bracket rotating unit 140 unconstrains rotation of the first bracket 120 and second bracket 130, and therefore does not consume power, but in response to receiving an operating signal, the bracket rotating unit 140 consumes power to rotate the first bracket 120 and second bracket 130 by as much as a desired angle. By doing this, it is possible to minimize power consumption.

In this embodiment, the bracket rotating unit 140 includes a first bracket rotating unit 150 connected to the first bracket 120 and configured to rotate the first bracket 120, and a second bracket rotating unit 160 arranged near the first bracket rotating unit, connected to the second bracket 130 and configured to rotate the second bracket 130. In this embodiment, the first bracket rotating unit 150 and the second bracket rotating unit 160 have a same or similar structure, and thus for the sake of convenience of explanation, explanation will be made with the focus on the configuration of the first bracket 120.

The first bracket rotating unit 150 is connected to the frame unit 110 in a rotatable manner, and includes a main pulley 151 to which the first bracket 120 is coupled, and a pulley rotating unit 152 connected to the main pulley 151 and rotating the main pulley 151.

The main pulley 151 is connected to the frame unit 110 in a rotatable manner. Such a main pulley 151 is coupled to a connecting unit 123 provided in the first bracket 120 to interlock the rotation of the main pulley 151 with the rotation of the first bracket 120.

The pulley rotating unit 152 is connected to the main pulley 151 and rotates the main pulley 151. Such a pulley rotating unit 152 is connected to the frame unit 110 in a rotatable manner, and includes a sub pulley 153 connected to the frame unit 110 in a rotatable manner and distanced from the main pulley 151; a wire 154 connected to the main pulley 151 and sub pulley 153, and that rotates the main pulley 151 and sub pulley 153; and a wire motion unit 155 connected to the wire 153 and moves the wire 154.

The sub pulley 153 is connected to the frame unit 110 in a rotatable manner, and is placed in a distanced position from the main pulley 151. Such a sub pulley 153 is connected to the main pulley 151 by the wire 154.

The wire 154 connects the main pulley 151 and sub pulley 153, and rotates the main pulley 151 and sub pulley 153.

The wire motion unit 155 is connected to the wire 154 and moves the wire 154. The wire motion unit 155 includes an LM block 156 to which the wire 154 is coupled, an LM guide 157 that guides the motion of the LM block 156, and an LM block driving unit 158 that moves the LM block 156.

The LM block driving unit 158 includes a driving motor 158a, a ball screw 158b that is connected to the driving motor 158a and is configured to be rotated by the driving motor 158a, and a moving nut 158c that is coupled to the LM block 156 and is geared to the ball screw 158b. The moving nut 158c is coupled to the LM block 156, and moves the LM block 156 according to the rotation of the ball screw 158b.

The driving motor 158a is connected to the battery module and receives power. Herein, the driving motor 158a and the battery module is electrically connected or disconnected according to an operating signal of the control module.

Furthermore, in this embodiment, the LM block driving unit 158 includes a plurality of power transmission gears 158d that connect the driving motor 158a and the ball screw 158b, and transmit the driving force of the driving motor 158a to the ball screw 158b.

Meanwhile, the frame unit 110 includes a main frame 111; and a tension adjusting unit 112 that is supported to the main frame 111 and that adjusts the tension of the wire 154 as it moves the sub pulley 153 in a direction of approaching or distancing from the main pulley 151.

Such a tension adjusting unit 112 includes a motion block 113 to which the sub pulley 153 is coupled in a rotatable manner and that is connected to the main frame 111 in a moveable manner; a motion block guide unit 114 that guides the motion of the motion block 113; and a motion block driving unit 115 that moves the motion block 113.

The motion block 113 is connected to the main frame 111 in a moveable manner, and to the motion block 113, the sub pulley 153 is coupled in a rotatable manner. For this purpose, the motion block 113 includes a motion block main body 113a to which the sub pulley 153 is coupled in a rotatable manner; and a guide arm 113b protruding from the motion block main body 113a and connected to the motion block guide unit 114.

The motion block guide unit 114 is connected to the motion block 113 to guide the motion of the motion block 113. For this purpose, the motion block guide unit 114 is coupled to the main frame 111, and is provided with a guide hole (not illustrated) through which the guide arm 113b passes.

The motion block driving unit 115 is connected to the motion block 113 and moves the motion block 113. Such a motion block driving unit 115 includes an adjusting screw 115 that is geared to the motion block guide unit 114 and presses the motion block 113.

In this embodiment, the adjusting screw 115 presses the motion block 113 in a direction away from the main pulley 151. Therefore, the tension of the wire 154 is adjusted as the sub pulley 153 arranged in the motion block 113 is distanced away from the main pulley 151 by the pressing made by the adjusting screw 115.

Hereinafter, an operation of the aforementioned active joint module 100 and the robot for inspecting pipelines having the active joint module according to an embodiment of the present disclosure will be explained with reference to FIG. 3 and FIG. 10.

When the robot for inspecting pipelines according to this embodiment changes it's proceeding direction as it passes a route divergent area (for example, divergent pipeline), the active joint module 100 rotates the first bracket 120 or second bracket 130 to the changed direction, thereby improving the proceeding of the robot for inspecting pipelines.

Such rotation of the first bracket 120 is made by an operation of the driving motor 158a. That is, the rotating force of the driving motor 158a is transmitted to the ball screw 158b, thereby rotating the ball screw 158b, and then the LM block 156 is moved by the rotation of the ball screw 158b. The motion of the LM block 156 moves the wire 154, and the motion of the wire 154 rotates the main pulley 151 connected to the wire 154. By such a rotation of the main pulley 151, the first bracket 120 coupled to the main pulley 151 is rotated in an interlocked manner with the main pulley 151.

The second bracket 130 is also rotated in the same manner as the first bracket 120 illustrated in FIG. 10, and for convenience of explanation, explanation on the rotation of the second bracket 130 will be omitted.

Meanwhile, as aforementioned, the driving motor 158a is connected to the battery module and is provided with power. Herein, the driving motor 158a and the battery module is electrically connected or disconnected according to an operating signal of the control module.

Therefore, power of the battery module is transmitted to the driving motor 158a only in a case of passing a route divergent area, whereas in a case of passing a general area (for example, straight pipeline) where a change of route is unnecessary, power is not transmitted to the driving motor 158a, thereby saving unnecessary waste of power.

Furthermore, the active joint module 100 according to this embodiment unconstrains the rotation of the first bracket 120 and second bracket 130 when the power is not being supplied, and therefore when the robot for inspecting pipelines is driving along a curved pipeline, the first bracket 120 and second bracket 130 may be rotated flexibly along the shape of the pipeline, thereby improving the steering performance.

Furthermore, there is an advantage that in a case of withdrawing the robot for inspecting pipelines due to an emergency (for example, breakdown of the driving module or discharge of the battery module) during an inspection process of a pipeline, the first bracket 120 and second bracket 130 may be flexibly rotated along the shape of the pipeline, facilitating the withdrawal.

In the active joint module 100 and the robot for inspecting pipelines provided with the active joint module 100 according to this embodiment, in a route divergent area, the bracket rotating unit 140 may actively rotate the first bracket 120 to which the first module (Y1) is coupled and the second bracket 130 to which the second module (Y2) is coupled in response to an operating signal so as to adjust the rotating angle of the first bracket 120 and second bracket 130, thereby improving the driving performance of the robot for inspecting pipelines, and when driving in a general area, the bracket rotating unit 140 may unconstrain the rotation of the first bracket 120 and second bracket 130, thereby preventing unnecessary energy consumption.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure

REFERENCE NUMERALS

100: ACTIVE JOINT MODULE
110: FRAME UNIT
111: MAIN FRAME
112: TENSION ADJUSTING UNIT
113: MOTION BLOCK
113A: MOTION BLOCK MAIN BODY
113B: GUIDE ARM
114: MOTION BLOCK GUIDE UNIT
115: MOTION BLOCK DRIVING UNIT
120: FIRST BRACKET
130: SECOND BRACKET
140: BRACKET ROTATING UNIT
150: FIRST BRACKET ROTATING UNIT
151, 161: MAIN PULLEY
152, 162: PULLEY ROTATING UNIT
153, 163: SUB PULLEY
154, 164: WIRE
155, 165: WIRE MOTION UNIT
156, 166: LM BLOCK
157, 167: LM GUIDE
158, 168: LM BLOCK DRIVING UNIT
158A, 168A: DRIVING MOTOR
158B, 168B: BALL SCREW
158C, 168C: MOVING NUT
158D, 168D: POWER TRANSMISSION GEAR
160: SECOND BRACKET ROTATING UNIT

Y1: FIRST MODULE
Y2: SECOND MODULE

What is claimed is:

1. An active joint module comprising:
   a frame unit;
   a first bracket connected to one side of the frame unit in a rotatable manner, and coupled to a first module;
   a second bracket connected to another side of the frame unit in a rotatable manner, and coupled to a second module; and
   a bracket rotating unit supported to the frame unit, and configured to selectively control between respective independent controlled rotations of the first bracket and second bracket and respective not constraining of rotations of the first bracket and second bracket.

2. The active joint module of claim 1, wherein the bracket rotating unit performs the selective control, in response to an operating signal received from a controller, between the respective independent rotations of the first bracket and second bracket and the respective not constraining of rotation of the first bracket and second bracket.

3. The active joint module of claim 1, wherein the bracket rotating unit comprises:
   a first bracket rotating unit connected to the first bracket and configured to rotate the first bracket; and
   a second bracket rotating unit arranged near the first bracket rotating unit and connected to the second bracket, and configured to rotate the second bracket.

4. The active joint module of claim 3, wherein the first bracket rotating unit and second bracket rotating unit comprise:
   a main pulley connected to the frame unit in a rotatable manner, and to which the first bracket and second bracket are coupled, respectively; and
   a pulley rotating unit connected to the main pulley, and configured to rotate the main pulley.

5. The active joint module of claim 4, wherein the pulley rotating unit comprises:
   a sub pulley connected to the frame unit in a rotatable manner, and arranged in a distanced position from the main pulley;
   a wire connected to the main pulley and sub pulley, and configured to rotate the main pulley and sub pulley; and
   a wire motion unit connected to the wire, and configured to move the wire.

6. The active joint module of claim 5, wherein the wire motion unit comprises:
   a block to which the wire is coupled;
   a guide configured to guide a motion of the block; and
   a block driving unit configured to move the block.

7. The active joint module of claim 6, wherein the block driving unit comprises:
   a driving motor;
   a ball screw connected to the driving motor, and configured to be rotated by the driving motor; and
   a moving nut coupled to the block, and configured to be geared to the ball screw.

8. The active joint module of claim 7, wherein the block driving unit comprises a plurality of power transmission gears configured to connect the driving motor and ball screw, and to transmit driving force of the driving motor to the ball screw.

9. The active joint module of claim 5, wherein the frame unit comprises:
   a main frame; and
   a tension adjusting unit coupled to the main frame, and configured to move the sub pulley in a direction approaching or distancing from the main pulley so as to adjust tension of the wire.

10. The active joint module of claim 9, wherein the tension adjusting unit comprises:
    a motion block to which the sub pulley is coupled in a rotatable manner, the motion block being connected to the main frame in a movable manner;
    a motion block guide unit configured to guide a motion of the motion block; and
    a motion block driving unit configured to move the motion block.

11. The active joint module of claim 10, wherein in the motion block guide unit, a guide hole is formed through which a guide arm protruding from the motion block passes.

12. The active joint module of claim 11, wherein the motion block driving unit comprises an adjusting screw geared to the motion block guide unit and configured to press the motion block.

13. A robot for inspecting pipelines having an active joint module comprising:
    a frame unit;
    a first bracket connected to one side of the frame unit in a rotatable manner, and coupled to a first module;
    a second bracket connected to another side of the frame unit in a rotatable manner, and coupled to a second module; and
    a bracket rotating unit comprising a main pulley and coupled to the frame unit,
    wherein the main pulley comprises a first main pulley and a second main pulley configured to rotate the first bracket and second bracket independently from each other.

14. The robot according to claim 13, wherein the bracket rotating unit rotates the first bracket and second bracket independently from each other in response to an operating signal received from a controller.

15. The robot according to claim 13, wherein the bracket rotating unit comprises:
    a first bracket rotating unit connected to the first bracket, and configured to rotate the first bracket; and
    a second bracket rotating unit arranged near the first bracket rotating unit, connected to the second bracket, and configured to rotate the second bracket.

16. The robot according to claim 15, further comprising:
    a pulley rotating unit comprising a first pulley rotating unit configured to rotate the first main pulley and a second pulley rotating unit configured to rotate the second main pulley.

17. The robot according to claim 16, wherein the pulley rotating unit comprises:
    a sub pulley connected to the frame unit in a rotatable manner, and arranged in a distanced position from the main pulley;
    a wire connected to the main pulley and sub pulley, and configured to rotate the main pulley and sub pulley; and
    a wire motion unit connected to the wire, and configured to move the wire.

18. The robot according to claim 17, wherein the wire motion unit comprises:
    a block to which the wire is coupled;
    a guide configured to guide a motion of the block; and
    a block driving unit configured to move the block.

19. The robot according to claim 18, wherein the block driving unit comprises:
    a driving motor;

a ball screw connected to the driving motor, and configured to be rotated by the driving motor; and a moving nut coupled to the block, and configured to be geared to the ball screw.

20. The robot according to claim 19, wherein the block driving unit comprises a plurality of power transmission gears configured to connect the driving motor and ball screw, and to transmit driving force of the driving motor to the ball screw.

\* \* \* \* \*